United States Patent [19]

Vandling

[11] 3,912,861

[45] Oct. 14, 1975

[54] METHOD AND APPARATUS FOR TIME COMPRESSION OF FACSIMILE TRANSMISSIONS

[75] Inventor: John M. Vandling, Pleasantville, N.Y.

[73] Assignee: Exxon Research and Engineering Company, Linden, N.J.

[22] Filed: Jan. 30, 1974

[21] Appl. No.: 437,914

[52] U.S. Cl. ...... 178/7.1; 178/DIG. 3; 178/DIG. 27

[51] Int. Cl.[2] ........................................... H04N 7/12

[58] Field of Search ............ 178/6, DIG. 3, DIG. 27, 178/7.1

[56] References Cited

UNITED STATES PATENTS

| | | | |
|---|---|---|---|
| 3,201,512 | 8/1965 | Mason | 178/DIG. 27 |
| 3,502,803 | 3/1970 | Bigenwald | 178/DIG. 3 |

*Primary Examiner*—Howard W. Britton
*Attorney, Agent, or Firm*—N. Norris

[57] ABSTRACT

In a facsimile transceiver, a reading or video fiber optic which is connected to a photodetector optically communicates with a document. A leading or look-ahead fiber optic which is also coupled to the same photodetector also optically communicates with the document. When the document is being slowly scanned, the position of optical communication between the reading fiber optic and the document is illuminated through fiber optics associated with the reading fiber optic and signals representing the sensing of dark and light regions are transmitted to a like transceiver. When a predetermined length of time has elapsed since sensing the last dark region, the position of optical communication between the leading fiber optic and the document is illuminated by fiber optics associated with the leading fiber optic and a fast scanning rate is initiated. Sensing of the first dark region by the photodetector via the leading fiber optic reinitiates the slow scanning rate and illumination of the position of the optical communication between the reading fiber optic and the document.

18 Claims, 2 Drawing Figures

METHOD AND APPARATUS FOR TIME COMPRESSION OF FACSIMILE TRANSMISSIONS

BACKGROUND OF THE INVENTION

This invention relates to facsimile systems comprising a transmitter, a receiver and a communications network therebetween. More particularly, this invention relates to a system wherein a document is scanned in a facsimile transmitter to generate electrical information-bearing signals representing the dark-light variations in the document being scanned. These information-bearing signals are then transmitted over the communications network to a facsimile receiver where the information-bearing signals are converted to marks or images on a copy medium so as to form a copy which is a reasonable facsimile of the original document.

Typically, the communications network comprises ordinary telephone lines which have a limited bandwidth capacity. In order to stay within the bandwidth, the scan rate must be maintained so that the maximum frequency of lightdark variations is maintained within the bandwidth.

Heretofore, various line-skipping facsimile schemes have been proposed to permit a rapid facsimile transmission by utilizing a fast scanning rate over those portions of a document or image which are devoid of information. Systems of this type are disclosed in U.S. Pat. No. 3,286,026—Greutman et al, U.S. Pat. No. 3,128,338 — Teacher et al and U.S. Pat. No. 2,287,413 — Bruce et al. Other systems employing line-skipping techniques include those disclosed in U.S. Pat. No. 3,448,207 — Green et al and U.S. Pat. No. 3,201,512 — Mason et al, both of which disclose optical communication between the photodetectors and the document by means of fiber optics. Fiber optics are also employed in the facsimile time compression system disclosed in copending application Ser. No. 449,514 filed Mar. 8, 1974 and assigned to the assignee of this invention.

In the aforesaid systems, a separate photodetector was utilized for each position of optical communication with the document. In other words, where time compression required two positions of optical communication with a document, i.e., a read or video position and a lead or scanning control position which scans the document in advance of the read or video position, two separate photodetectors are provided.

The use of a photodetector for each position of optical communication with the document adds of course to the expense of a facsimile transmitter. This is particularly true where separate preamplification is provided for each photodetector. Expense can be compounded where two level clamping (black and white) and blanking circuitry are provided in conjunction with each photodetector.

Moreover, where separate photodetectors are utilized, it is generally necessary to carefully match the characteristics of the photodetectors so as to assure identical responses for the photodetectors. It will, of course, be appreciated that if the lead or look-ahead photodetector fails to sense a dark region on the document which would be sensed by the read or video photodetector and vice versa, the scanning rates may be erroneously controlled and this, in turn would produce a faulty facsimile. Of course, the additional circuitry associated with separate photodetectors and the requirement for identical responses can produce reliability problems.

SUMMARY OF THE INVENTION

It is an object of this invention to provide an improved method and apparatus for reducing the time for transmission of signals from one location to another for use in producing a facsimile of a document.

It is a more specific object of this invention to provide a low cost method and apparatus for reducing the time for generation and transmission of facsimile signals.

It is a further specific object of this invention to provide an improved reliable method and apparatus for reducing the time for generation and transmission of facsimile signals.

In accordance with these and other objects of this invention, a facsimile transceiver comprises optical sensor means in optical communication with a document at two different positions for generating signals representing the sensing of light and dark regions on the document. Signal transmitting means are coupled to the sensor means for generating transmission signals representing the sensing of light and dark regions on the document and scanning means scan the different positions of optical communication over the document at a fast scanning rate or a slow scanning rate with one of the positions scanning in advance of the other of the positions. Leading illumination means illuminate the dark and light regions on the document in one of the positions and reading illumination means illuminate the dark and light regions on the document in the other of the positions. Scanning rate and illumination control means coupled to the sensor means automatically change from the slow scanning rate to the fast scanning rate and energize the leading illumination means in response to the sensing of a relatively low density of dark regions and automatically change from the fast scanning rate to the slow scanning rate and deenergize the leading illumination means in response to the sensing of a relatively high density of dark regions.

In the preferred embodiment, the reading illumination means is energized during the slow scanning rate and deenergized during the fast scanning rate. However, it is possible and may, in some instances, be desirable, to continually energize the reading illumination means.

In accordance with one important aspect of the invention, the optical sensor means comprises a photodetecting device optically coupled to both positions of optical communication with the document. The optical sensor means may further comprise leading fiber optic means coupling the photodetecting device to one of the two positions and reading fiber optic means optically coupling the photodetecting device to the other of the two positions.

In accordance with another aspect of the invention, the scanning rate and illumination control means comprises timing means coupled to the optical sensor means for measuring the time elapsed between the sensing of dark regions during slow scanning where the timing means is automatically reset in response to the sensing of a dark region by the optical sensor means. Switch means are coupled to the output of the timing means and the input of the leading illumination means and reading illumination means of the scanning means such that the scanning rate and energization of the leading and reading illumination means are responsive to the state of the switch means. The timing means may comprise clock means for generating clock pulses synchronized with the scanning of the document at the slow scanning rate and counting means having an input coupled to the output of the clock means. The counting means are coupled to the optical sensor means for automatically resetting the counting means in response to the sensing of a dark region with the output of the counting means coupled to the switch means.

In accordance with another important aspect of the invention, the apparatus comprises receiving means for receiving signals representing the sensing of light and dark regions on a document and writing means coupled to the output of the receiving means for marking on a copy medium where the writing means is coupled to the scanning means so as to move relative to the copy medium. The counting means is coupled to the receiving means for automatically resetting the counting means in response to the reception of a signal representing a dark region. The switch means is coupled to the writing means so as to enable the writing means when scanning at the slow scanning rate and disable the writing means when scanning at the fast scanning rate.

DETAILED DESCRIPTION OF A PREFERRED EMBODIMENT

Figure 1:
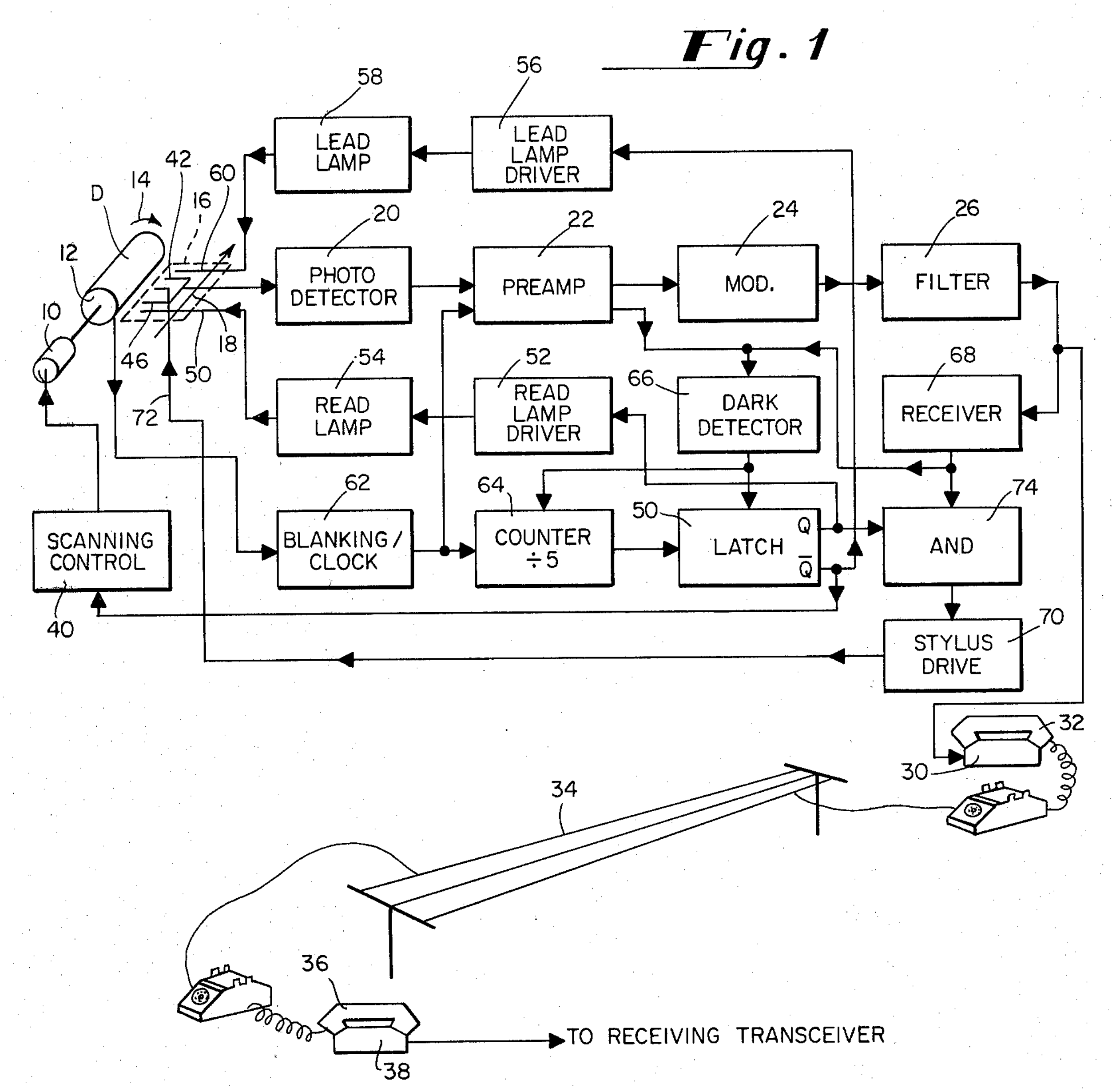
FIG. 1 is a block diagram of a facsimile system depicting a preferred embodiment of the invention.

Referring now to the facsimile system shown in FIG. 1, a facsimile transmitter comprises a drum 12 rotated by a motor 10 in a direction indicated by an arrow 14 so as to create a relative scanning movement between a document carried by the drum 12 and a scanning head 16 shown in dotted lines. As the scanning head 16 is advanced axially along the drum 12 in the direction indicated by the arrow 18 and the drum rotates about its axis in the direction indicated by the arrow 14, successive paths on the document are illuminated and variations in light intensity due to the reflectivity and absorption of the document are detected by optical sensor means comprising a photodetector 20. The photodetector 20 converts these variations in light intensity into electrical signals and these signals are amplified by a preamplifier 22. The output of the preamplifier 22 is coupled to a suitable modulator 24 for generating transmission signals which are applied to a filter 26 which is, in turn, coupled to an acoustical coupler 30 which is associated with a conventional telephone handset 32. The frequency modulated signals representing the information content of the document mounted on the drum 12 may be transmitted to a like transceiver by suitable means such as conventional telephone lines 34 which are coupled to another conventional telephone handset 36 and an associated acoustical coupler 38.

In order to allow the entire contents of the document on the drum 12 to be transmitted in a relatively short period of time, scanning control circuitry 40 is provided which initiates fast scanning of the document by the head 16 when information voids or areas representing relatively low density of dark regions are detected by the photodetector 20 and which also initiates slow scanning of the head when areas of relatively high density of dark regions are detected by the photodetector 20. The input to the scanning control 40, which, in turn, determines the scanning rate of the document on the drum 12 is generated in a novel manner utilizing the single photodetector 20 as will now be described in detail.

Figure 2:
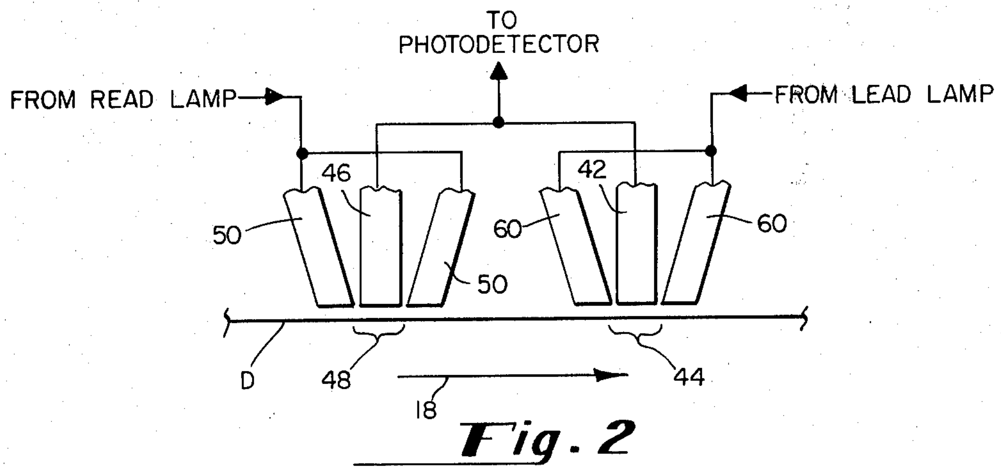
FIG. 2 is a partially schematic representation of the optical communication between a document and a photodetector by means of fiber optics.

As shown in FIGS. 1 and 2, the photodetector 20 optically communicates with two different positions on a document D carried on the drum 12. A leading or look-ahead fiber optic 42 which is coupled to the photodetector 20 optically communicates with one position 44 on the document D, and a reading or video fiber optic 46 which is also coupled to the photodetector 20 optically communicates with the document D at another position 48.

In accordance with this invention, the positions 44 and 48 on the document D are selectively illuminated depending upon the scanning rate of the head 16 relative to the document D which, in turn, depends upon the density of the dark regions in the area of the document D being scanned. When the density of the dark regions in the area of the document D being scanned is relatively high, a switch in the form of a latch 50 is set with the Q output high. The Q output is connected to a read lamp driver 52 which energizes a read lamp 54 so as to illuminate the position 48 on the document D through fiber opics 50 which are inclined with respect to the fiber optic 46 so as to assure a high degree of illumination for the position 48. At the same time, a lead lamp driver 56 which is connected to the $\overline{Q}$ output of the latch 50 is not enabled and a lead lamp 58 which is optically coupled to the leading position 44 through fiber optics 60 is deenergized. Consequently, the photodetector 20 is unable to determine the nature of the regions (dark or light) at the leading position 44. When the density of dark regions in the area being scanned becomes relatively low, the state of the latch 50 changes to make Q low and $\overline{Q}$ high and this, in turn, energizes the lead lamp 58, deenergizes the read lamp 54 and actuates the scanning control 40 so as to initiate the fast scanning rate.

In accordance with another important aspect of the invention, the sensing of the density of dark regions is provided in a novel manner. A timing means comprises a blanking/clock pulse generator 62 which generates pulses in synchronism with the rotation of the drum 14. The output from the blanking/clock pulse generator 62 is applied to a counter 64 where the particular counter 64 depicted in FIG. 1 is a divide-by-five counter.

As shown in FIG. 1, the transceiver also has a receiving capability as provided by receiver circuitry 68 which is coupled to a stylus drive 70 and a stylus 72. Note that the receiver circuitry 68 is also coupled to the dark detector 66 so that when the transceiver is utilized in the receiving mode, initiation of the fast scanning mode and the slow scanning mode is synchronized with initiation of those modes at a transmitter transceiver. In the normal slow scanning mode where dark regions are of sufficient density, signals representing the detection of dark regions on a document are applied to the dark detector 66 coupled to the output of the preamplifier 22 so as to repeatedly reset the counter 64 and the latch 50 to maintain the latch in the Q state. Where the dark regions are much less dense and their sensing is spaced in time, the counter 64 will reach a count of five before receiving an output from the dark detector 66 which will, in turn, change the state of the latch 50 so as to initiate the fast scanning mode. In order to enable the stylus drive 70 during the slow scanning mode and disable the stylus drive 70 in the fast scanning mode, AND circuitry 74 is provided between the output of the receiver circuitry 68 and the stylus drive 70. Since AND gate 74 will only be enabled when the latch is in the Q state, which corresponds with the slow scanning mode, the stylus drive 70 will only be enabled during the slow scanning mode.

As shown in FIG. 1, the read lamp 54 is energized when the lead lamp 58 is deenergized and vice versa. It should be appreciated that it is not absolutely necessary to deenergize the read lamp 54 while the lead lamp 58 is energized. In fact, it may even be desirable to continue energization of the read lamp 54 while the lead lamp 58 is energized. This would dark that the existence of any dary regions between the leading position 44 and reading position 48 would not be missed by energization of the lead lamp 58 and initiation of the fast scanning mode, since these dark regions would be sensed when the reading fiber optic 46 communicates with these dark regions. This constant energization of the read lamp 54 could readily be accomplished by eliminating the selective control of the read lamp driver 52 as provided by the Q output of the latch 50 so as to assure that the read lamp driver 52 is always in the ON state. However, such an arrangement would require some sort of compensation at the photodetector to permit it to reliably distinguish between black and white regions when the read lamp is on while at the same time to reliably distinguish between black and white regions when both the read lamp and the lead lamp are on.

As also shown in FIG. 1, a single photodetector 20 and a single preamplifier 22 have been utilized. However, it is possible to utilize a pair of photodetectors 20 and a single preamplifier 22 although this certainly is not necessary since the selective illumination of the document will readily permit the use of a single photodetector 20.

The circuit details for the modulator 24 and the receiver circuit 68 may be found in copending aplication Ser. No. 417,797 filed Nov. 21, 1973 which is assigned to the assignee of this invention and incorporated herein by reference.

The scanning control 40 may comprise switching circuitry for applying power to different windings of the motor 10. Preferably, separate head and drum motors are provided with an additional time compression head motor being utilized to advance the head for fast scanning. The lamp drivers 52 and 56 may comprise integrated circuitry such as the Texas Instruments 75451P chip or other commercially available integrated circuitry. The other circuitry described in block form in FIG. 1 is completely conventional and would be obvious to those of ordinary skill in the art.

Note that the counter 64 has been shown as a divide-by-five counter. The precise counter utilized is the result of a compromise between providing the minimum spacing between read and lead fiber optics (so as to permit the use of the fast scanning mode as often as possible even though the space between dark regions is relatively narrow) and sufficient spacing between read and lead fibers so as to permit the slow scanning speed to stabilize after switching from the fast scanning mode to the slow scanning mode. Thus the counter 64 might be a divide-by-two counter in some instances and a divide-by-10 counter in other instances. Also, the nature of the counter will be dependent upon the number of clock pulses per revolution of the drum. Note that the words "clock pulses" as utilized herein are intended to mean pulses which have a constant frequency relative to the scanning rate, e.g., the rotation of the drum and not constant at all times.

Although a specific embodiment of the invention has been shown and described and particular modifications have been suggested, it will be understood that other embodiments and modifications which would occur to those or ordinary skill in the art fall within the true spirit and scope of the invention as set forth in the appended claims.

What is claimed is:

1. Apparatus for producing a facsimile at one location of a document at another location comprising:

optical sensor means in optical communication with said document at two different positions, said sensor means generating signals representing the sensing of light and dark regions on said document;

signal transmitting means coupled to said sensor means for generating transmission signals representing the sensing of said light and dark regions on said document;

scanning means for scanning said two different positions of optical communication over said document with one of said positions scanning in advance of the other of said positions, said scanning means having a fast scanning rate and a slow scanning rate;

leading illumination means associated with said one of said positions of optical communication so as to illuminate dark and light regions on said document in said one of said positions;

reading illumination means associated with said other of said positions of optical communication so as to illuminate dark and light regions on said document in said other of said positions when said reading illumination means is energized; and scanning rate and illumination control means coupled to said sensor means for automatically changing from said slow scanning rate to said fast scanning rate and energizing said leading illumination means and deenergizing said reading illumination means in response to the sensing of a large light region between dark regions and automatically changing from said last scanning rate to said slow scanning rate in response to the sensing of a dark region after sensing a large light region, deenergizing said leading illumination means and energizing said reading illumination means.

2. The apparatus of claim 1 further comprising:

receiving means for receiving signals representing the sensing of light and dark regions on a doocument;

writing means coupled to the output of said receiving means for marking on a copy medium, said scanning means also being coupled to said writing means for moving said writing means relative to said copy medium; and said scanning rate and illumination control means being coupled to said receiving means for automatically changing from said slow scanning rate to said fast scanning rate in response to the reception of signals representing a large light region between dark regions and automatically changing from said fast scanning rate to said slow scanning rate in response to the reception of signals representing the sensing of a dark region after the reception of signals representing the sensing of a large light region.

3. The apparatus of claim 1 wherein said optical sensor means comprises a photodetecting device optically coupled to both of said two positions of optical communication.

4. The apparatus of claim 3 wherein said optical sensor means further comprises leading fiber optic means optically coupling said photodetecting device to said one of said two positions of optical communication and reading fiber optic means optically coupling said photodetecting device to said other of said two positions of optical communication.

5. The apparatus of claim 1 wherein said scanning control means comprises:

timing means coupled to said sensor means for measuring the time elapsed between the sensing of dark regions, said timing means being automatically reset in response to the sensing of a dark region by said sensor means; and switch means having an input coupled to the output of said timing means and an output coupled to said leading illumination means and said scanning means, the scanning rate and the energization of said leading illumination means being responsive to the state of said switch means.

6. The apparatus of claim 5 wherein said timing means comprises:

clock means for generating clock pulses synchronized with the scanning of said document at said slow scanning rate; and counting means having an input coupled to the output of said clock means, said counting means being coupled to said optical sensor means for automatically resetting said counting means in response to the sensing of a dark region, the output of said counting means being coupled to the input of said switch means.

7. The apparatus of claim 6 wherein said clock means comprises means for generating clock pulses in timed relationship with rotation of said drum.

8. The apparatus of claim 6 further comprising:

receiving means for receiving signals representing the sensing of light and dark regions on a remotely located document;

writing means coupled to the output of said receiving means for marking on a copy medium, said scanning means also being coupled to said writing means for moving said writing means relative to said copy medium;

said counting means being coupled to said receiving means for automatically resetting said counting means in response to the reception of signals representing a dark region; and said switch means being coupled to said writing means so as to enable said writing means when scanning at said slow scanning rate and disable said writing means when scanning at said fast scanning rate.

9. Apparatus for producing a facsimile at one location of a document at another location comprising:

optical sensor means in optical communication with said document at two different positions, said sensor means generating signals representing the sensing of light and dark regions on said document;

signal transmitting means coupled to said sensor means for generating transmission signals representing the sensing of said light and dark regions on said document;

scanning means for scanning said two different positions of optical communication over said document with one of said positions scanning in advance of the other of said positions, said scanning means having a fast scanning rate and a slow scanning rate;

leading illumination means associated with said one of said positions of optical communication so as to illuminate dark and light regions on said document in said one of said positions when said leading illumination means is energized;

reading illumination means associated with said other of said positions of optical communication so as to illuminate dark and light regions on said document in said other of said positions when said reading illumination means is energized; and scanning rate and illumination control means coupled to said sensor means for automatically changing from said slow scanning rate to said fast scanning rate and energizing said leading illumination means in response to the sensing of a relatively low density of dark regions and automatically changing from said fast scanning rate to said slow scanning rate and deenergizing said leading illumination means in response to the sensing of a substantially higher density of dark regions.

10. The apparatus of claim 9 further comprising:

receiving means for receiving signals representing the sensing of light and dark regions on a document;

writing means coupled to the output of said receiving means marking on a copy medium, said scanning means also being coupled to said writing means for moving said writing means relative to said copy medium;

said scanning rate and illumination control means being coupled to said receiving means for automatically changing from said slow scanning rate to said fast scanning rate in response to the reception of signals representing a low density of said dark regions and automatically changing from said fast scanning rate to said slow scanning rate in response to reception of signals representing a substantially higher density of dark regions.

11. The apparatus of claim 9 wherein said scanning rate and illumination control means deenergizes said reading illumination means in response to the sensing of a relatively low density of dark regions and energizes said reading illumination means in response to the sensing of a substantially higher density of dark regions.

12. The apparatus of claim 9 wherein an optical sensor means comprises a photodetecting device optically coupled to both of said two positions of optical communication.

13. The apparatus of claim 12 wherein said optical sensor means further comprises leading fiber optic means optically coupling said photodetecting device to said one of said two positions of optical communication and reading fiber optic means optically coupling said photodetecting device to said other of said two positions of optical communication.

14. A method of operating a facsimile transmitter comprising optical sensor means in optical communication with a document at two different positions, signal transmitting means coupled to said optical sensor means, scanning means for moving said two different positions relative to said document with one of said positions scanning in advance of the other of said positions, leading illumination means associated with said one of said positions, and reading illumination means associated with said other of said positions, said method comprising the following steps:

illuminating said document with said reading illumination means at said other of said positions without illuminating said document with said leading illumination means at said one of said positions;

sensing light and dark regions on said document with said optical sensor means at said other of said positions;

scanning said document at a slow scanning rate so as to scan said other of said positions along said document;

transmitting signals representing the sensing of light and dark regions at said other of said positions;

detecting a relatively low density of dark regions sensed at said other of said positions;

illuminating said document with said leading illumination means at said one of said positions after sensing said low density of dark regions;

sensing light and dark regions on said document with said optical sensor means at said one of said positions;

scanning the document at a fast scanning rate; and sensing said light and dark regions at said one of said positions.

15. The method of claim 14 wherein said document is illuminated at said one of said positions without simultaneously illuminating said document at said other of said positions.

16. The method of claim 14 further comprising the following steps:

detecting a relatively high density of dark regions at said one of said positions;

terminating illumination of said document at said one of said positions while illuminating said document at said other of said positions;

sensing light and dark regions on said document with said optical sensor means at said other of said positions; and scanning said document at a slow scanning rate.

17. The method of claim 16 wherein said step of detecting a relatively low density of dark regions comprises measuring the time elapsed since sensing the last dark region.

18. The method of operating a facsimile trànsmitter comprising optical sensor means in optical communication with a document at a leading position and a reading position during scanning of said document with said leading position scanning in advance of said reading position, said method comprising the following steps:

illuminating said reading position without illuminating said leading position while slowly scanning areas of said document having a relatively high density of dark regions; and illuminating said leading position while rapidly scanning areas of said document having a relatively low density of dark regions.

* * * * *